Patented Dec. 17, 1929

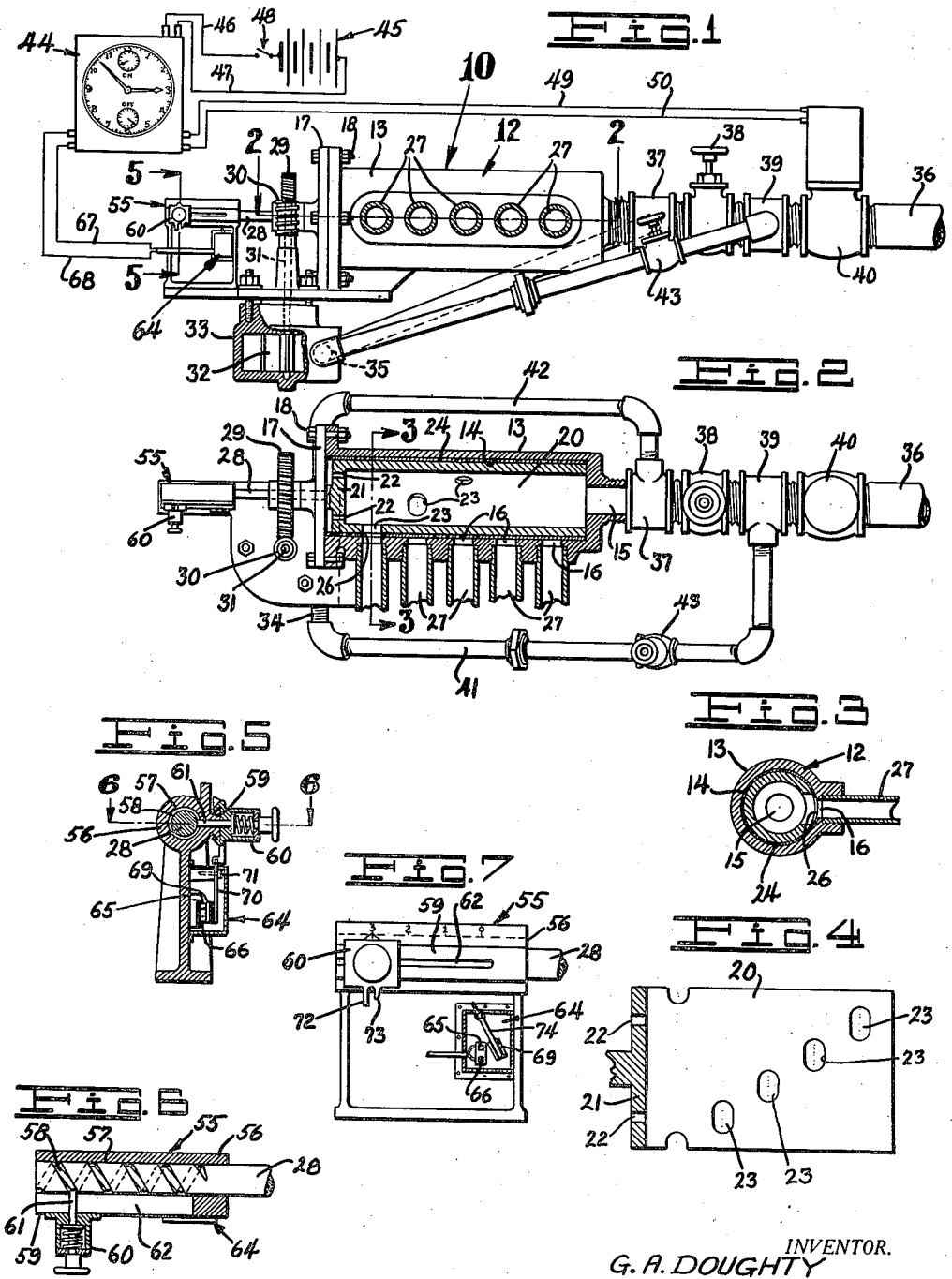

1,739,787

UNITED STATES PATENT OFFICE

GLENN A. DOUGHTY AND HERBERT A. JOHNSTON, OF ANAHEIM, CALIFORNIA

FLUID-CONTROLLING SYSTEM

Application filed December 26, 1928. Serial No. 328,549.

This invention relates to improvements in fluid-controlling systems.

The general object of the invention is to provide an improved device for automatically controlling the flow of fluid.

A specific object of our invention is to provide a device of the class described which is actuated by the flow of the fluid which it controls.

A further object of the invention is to provide an improved fluid flow control device which is adapted to be started and stopped by an electric clock.

Another object of the invention is to provide a device of the class described including means adapted to automatically stop the actuation of the device after a predetermined number of operations.

Other objects of this invention and the advantages thereof will be apparent from the following description taken in connection with the accompanying drawings wherein:

Fig. 1 is a side elevation of our invention with the electrical hook-up shown diagrammatically.

Fig. 2 is a section taken on line 2—2 of Fig. 1.

Fig. 3 is a section taken on line 3—3 of Fig. 2.

Fig. 4 is a development of the rotor showing the relation of the parts therein.

Fig. 5 is an enlarged section of the automatic stop taken on line 5—5 of Fig. 1.

Fig. 6 is a section taken on line 6—6 of Fig. 5, and

Fig. 7 is an enlarged face view of the automatic stop device.

Referring to the drawing by reference characters we have indicated our improved device generally at 10. This device is primarily intended for use in a lawn sprinkling system but it will be understood that it may be used for any purpose for which it may be adapted.

As shown, the device 10 includes a distributing valve 12 which comprises a housing 13, having a central cylindrical recess 14 therein, and provided with an inlet 15 at one end and a plurality of outlets 16 arranged along one side. The end of the recess 14 opposite the inlet is closed by a cap 17 secured to the housing 13 by bolts 18 or in any other suitable manner.

In the recess 14 we position a rotor 20 which is open at the end adjacent the inlet 15 and closed by a partition 21 at the end adjacent the cap 17 as shown, and in the partition 21 a plurality of bleed apertures 22 are provided. In the circumferential wall of the rotor a plurality of ports 23 are provided which are arranged in staggered relation to each other as clearly shown in Fig. 4. These ports are longitudinally aligned with the outlets 16 in the housing 13 and upon rotation of the rotor 20 are adapted to consecutively align with the outlets 16.

Between the rotor 20 and the peripheral wall of the recess 14 we preferably provide a packing sleeve 24 which is provided with a plurality of apertures 26 which may be either secured to the rotor 20 and rotate therewith or be secured to the housing 13. When the packing sleeve 24 is secured to the housing 13 the aperture 26 will be aligned with the outlets 16 and when it is secured to the rotor 20 the apertures 26 will be aligned with the ports 23 in the rotor.

The packing sleeve may be made of leather, rubber, composition or any other suitable material.

Distributing pipes 27 communicate with the outlets 16 and may convey the water to any desired location, as e. g., a number of spaced sprinkling heads.

The rotor 20 includes a shaft 28 which extends through the cap 17 and has a worm gear 29 secured thereto which is adapted to mesh with a worm pinion 30 on a shaft 31. As shown the shaft 31 is adapted to be rotated by an impeller 32 encased in a housing 33 which includes an inlet 34 and an outlet 35. Although we have shown a simple type of fluid motor it will be understood that any desired type of fluid motor may be used.

For supplying fluid to the distributing valve 12 we provide a pipe line 36 which communicates with the inlet 15 of the housing 13. This pipe line 36 includes a T fitting 37 adjacent the inlet 15, a manually operated shutoff valve 38, another T fitting 39 and an electrically operated shutoff valve 40. A pipe line 41 connects the fluid motor inlet 34 with the T fitting 39 and a pipe line 42 connects the fluid motor outlet with the T fitting 37.

When the device 10 is operatively installed in a lawn sprinkling system or other fluid distributing system the valve 38 is partly closed to thereby divert a portion of the flow in the pipe line 36 through the T fitting 39 into the pipe line 41 and to the fluid motor and thence from the fluid motor the fluid passes through the pipe line 42 and again enters the pipe line 36 through the T fitting 37. The pipe line 41 may be provided with a shutoff valve 43 so that a finer adjustment of the flow therein may be made.

The ports 23 are so radially spaced that before one of them moves out of register with its associated outlet 16 another of the ports 23 will register with its associated outlet 16 thereby at all times providing communication between the interior of the rotor 20 with some one of the distributing pipes 27 thereby assuring a flow of fluid to operate the device.

The bleed apertures 22 in the partition 21 allow fluid to enter the space between the partition and the cap 17 thereby equalizing the pressure on each side of the partition and forming a floating thrust bearing for the rotor 20.

For automatically controlling the starting and stopping of our device we preferably employ an electric clock as indicated at 44 which may be one of any of the well known makes designed for automatically controlling various devices. As shown the clock 44 is connected to a source of electric energy such as a battery 45 by wires 46 and 47 and the electrical circuit is preferably controlled by a switch 48. Wires 49 and 50 connect the clock 44 and the electrically operated shutoff valve 40.

When it is desired to automatically start the device at a predetermined time and automatically stop it at a predetermined time the start and stop mechanism of the clock 44 is set at the desired start and stop times. When the clock reaches the time for which it is set to start the device it sends an electrical current through the wires 49 and 50 to the electrically operated valve 40 which actuates the valve to an open position thereby allowing a flow of fluid to pass to the device which will in turn actuate the device as previously described.

When the clock reaches the time for which it is set to stop the device it will break the electrical circuit to the valve 40 whereupon the valve 40 will automatically close and stop the flow of fluid to the device.

For stopping the device upon a predetermined number of revolutions of the rotor 20 we provide an automatic stop indicated at 55. As shown the device 55 (see Figs. 5, 6 and 7) includes a housing 56 having a bore 57 therein in which the end of the shaft 28 is positioned. That portion of the shaft 28 which is positioned in the bore 57 is provided with a spiral groove 58.

The front face of the housing 56 is provided with a rail or track 59 on which a carrier 60 is mounted for sliding movement. The carrier 60 supports a spring pressed plunger 61 which is positioned in a groove 62 in the front face of the track 59 and the inner end of the plunger is adapted to be positioned in the spiral groove 58 of the shaft 28. Thus when the shaft 28 rotates the plunger 61 will move the carrier 60.

For closing an electrical circuit to cause the clock 44 to actuate to close the electric valve 40 we provide a switch 64 which includes a set of contacts 65 and 66 which are electrically connected to the clock by wires 67 and 68. For bridging the contacts 65 and 66 we provide a contact bar 69 mounted adjacent one end of an arm 70 which is pivoted intermediate its length as indicated at 71. The free end of the arm 70 is adapted to extend upward into the path of a finger 72 on the carrier 60.

As the carrier 60 is moved by the rotation of the shaft 28 the finger 72 engages the free end of the arm 70 and upon continued movement will rock the arm 70 and cause the contact bar 69 to bridge the contacts 65 and 66 thereby completing an electrical circuit and causing the clock 44 to actuate to close the valve 40.

When the carrier 60 is reset a finger 73 thereon is adapted to engage the free end of the arm 70 and rock the arm to move the contact bar out of engagement with the contacts 65 and 66.

From the foregoing it will be apparent that when it is desired to set the device to actuate for a certain number of revolutions of the rotor the spring pressed plunger 61 is moved out of engagement with the spiral groove 58 and the carrier 60 is moved along the slide until it is in a position on the slide where the desired number of revolutions is indicated as shown in Fig. 7. The plunger 61 is then released and becomes positioned in the spiral groove 58 whereupon when the device is started by the clock, after the desired number of revolutions of the rotor, the carrier will actuate the switch 64 to cause the clock 44 to close the valve 40, thereby stopping the device.

Thus it will be seen that we have provided means controllable either by the length of time the device operates or by the number of revolutions the rotor makes to automatically stop the device.

From the foregoing description it will be apparent that we have provided a novel fluid control device which is simple in construction and efficient in operation.

Having thus described our invention what we claim is:

1. In a water distributing system, a casing having a plurality of distributing pipes thereon, a hollow rotor in said casing, means to conduct water from said rotor to said pipes in order, means to supply fluid to said rotor, and means operated by the fluid supplied to said rotor for turning said rotor.

2. In a fluid distributing system, a fluid supply pipe, a casing connected to said pipe, said casing including a plurality of spaced outlets, a rotor, said rotor having apertures therein adapted to be brought one after the other into communication with said outlets and means to drive said rotor from a portion of the fluid passing from the supply pipe to the rotor.

3. In a fluid distributing system, a fluid supply pipe, a casing connected to said pipe, said casing including a plurality of spaced outlets, a rotor, said rotor having apertures therein adapted to be brought one after the other into communication with said outlets, means to drive said rotor and means to stop said rotor after a predetermined number of revolutions thereof.

4. In a fluid control device, a casing having a rotor therein, means to supply fluid to said rotor, means to conduct fluid from said rotor, means to drive said rotor, and means to stop said driving means after the rotor has made a predetermined number of revolutions.

5. In a fluid distributing system, a fluid supply pipe, a casing connected to said pipe, said casing including a plurality of spaced outlets, a rotor, said rotor being hollow and having apertures therein adapted to be brought into communication one after the other with said outlets, a packing sleeve between said rotor and casing, and means to drive said rotor, said means including a hydraulic motor, and means to by-pass through the motor a portion of the fluid passing from the supply pipe to the rotor.

6. In a water distributing system, a casing having a plurality of distributing pipes thereon, a hollow rotor in said casing, means to conduct water from said rotor to said pipes in order, means to supply fluid to said rotor, means operated by the fluid supplied said rotor for turning said rotor, a valve to control the supply of water to said rotor, a clock, said clock including means for turning said valve on and off at a predetermined time, and other means to cause actuation of said valve after a predetermined number of rotations of said rotor.

7. In a fluid distributing device a casing, a rotor therein, said casing having a plurality of apertures therein, said rotor also having a plurality of apertures therein aligned with said casing apertures and adapted to be put into communication therewith one after the other upon rotation of said rotor, means to conduct fluid from said supply means to said motor, means to conduct fluid from said motor to said rotor, means including a valve to regulate the flow of fluid to said motor and means whereby said motor drives said rotor.

8. In a fluid distributing device a casing, a rotor therein, said casing having a plurality of apertures therein, said rotor also having a plurality of apertures therein aligned with said casing apertures and adapted to be put into communication therewith one after the other upon rotation of said rotor, means to supply fluid to said rotor, means to cause operation of said rotor, means including a valve to regulate the flow of fluid to said rotor, a shaft on said rotor, a housing in which the end portion of said shaft is mounted, said end portion having a groove therein, a carrier slidable on said housing, said carrier having means engaging in said groove, an operating member on said carriage, and means operable by said operating member to cause actuation of said valve.

9. In a fluid distributing device a casing, a rotor therein, said casing having a plurality of apertures therein, said rotor also having a plurality of apertures therein aligned with said casing apertures and adapted to be put into communication therewith one after the other upon rotation of said rotor, means to supply fluid to said rotor, a fluid operated motor, means to conduct fluid from said supply means to said motor, means to conduct fluid from said motor to said rotor, means including a valve to regulate the flow of fluid to said motor, means whereby said motor drives said rotor, said means including a shaft, said shaft projecting beyond said rotor, a housing in which an end portion of said shaft is mounted, said end portion having a helical groove therein, said housing having a guide rail thereon, a carrier slidable on said rail, said carrier having a spring pressed pin therein adapted to fit said groove, means to retract said pin, an electrically operated cutoff valve on said supply line, a circuit for controlling said valve, an operating member on said carriage, and means including an electric switch adapted to be operated by said operating member to cause actuation of said cutoff valve.

In testimony whereof, we hereunto affix our signatures.

GLENN A. DOUGHTY.
HERBERT A. JOHNSTON.